Oct. 27, 1942.  V. W. SHERMAN ET AL  2,299,934
INDUCTIVE HEATING APPARATUS AND METHOD
Filed Dec. 16, 1940  2 Sheets-Sheet 1
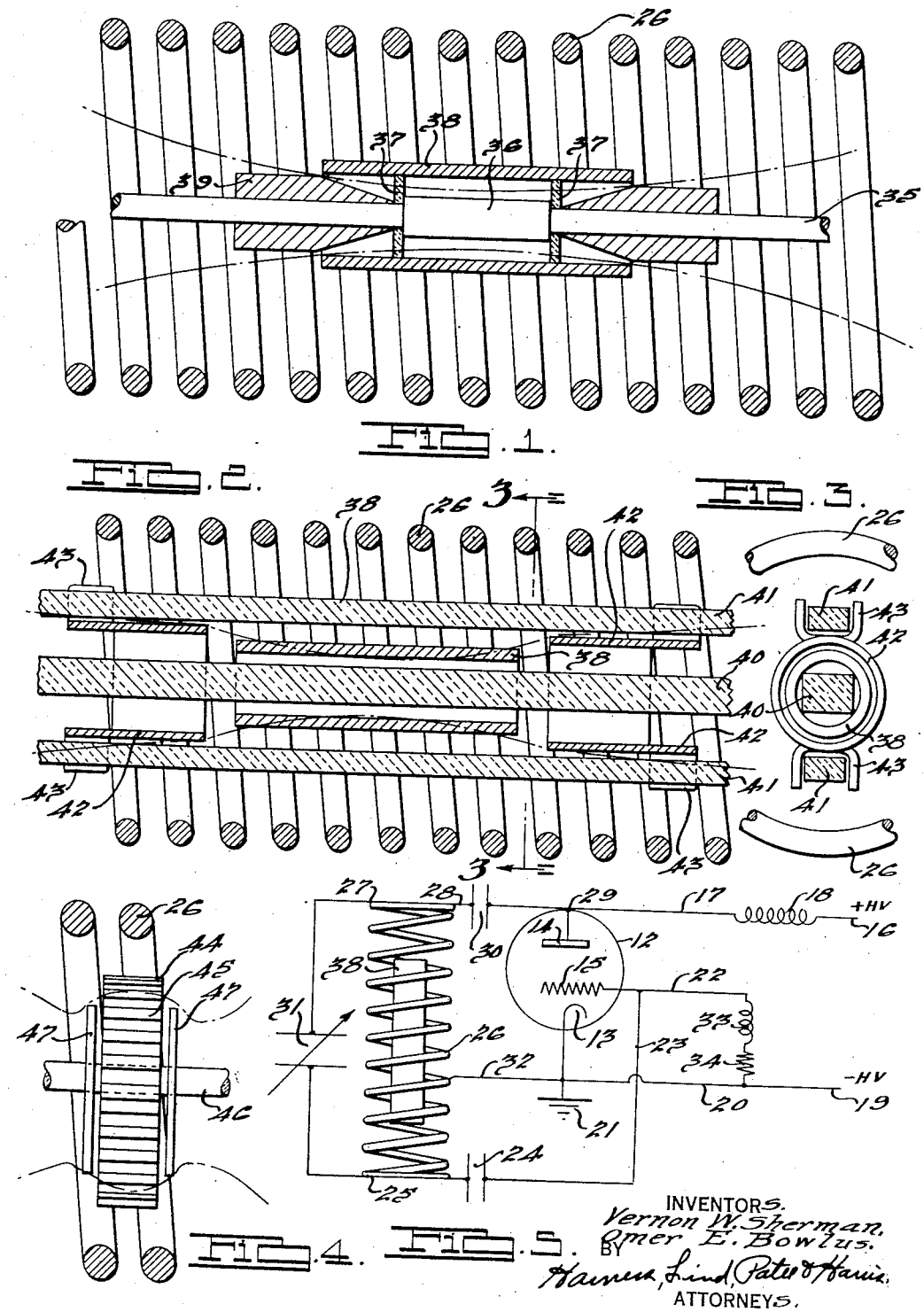
INVENTORS.
Vernon W. Sherman,
Omer E. Bowlus.
BY
ATTORNEYS.

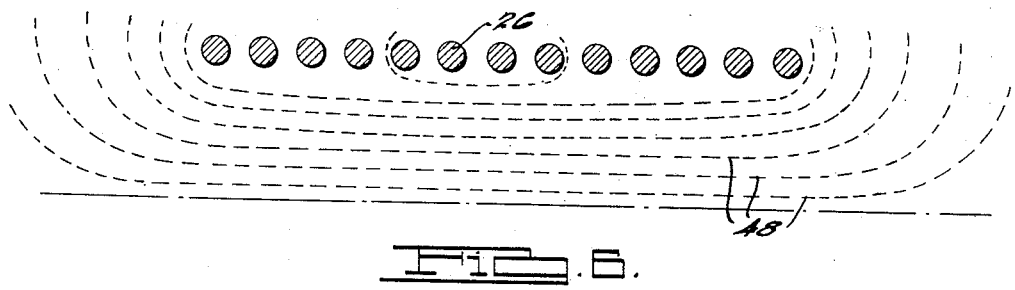
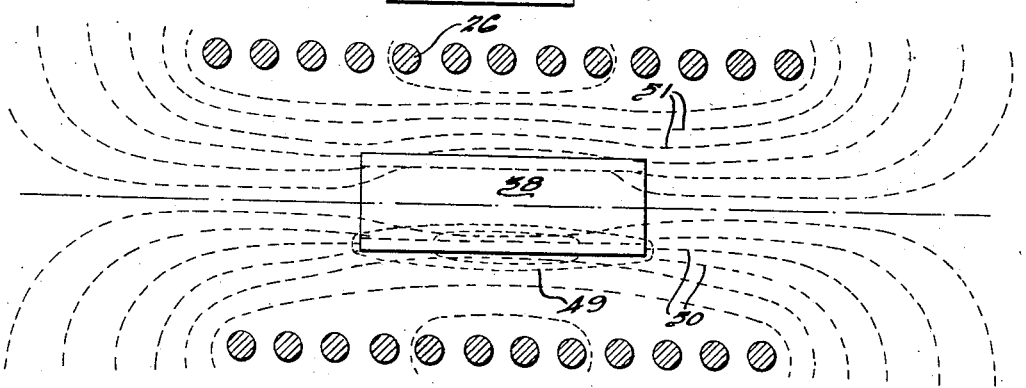
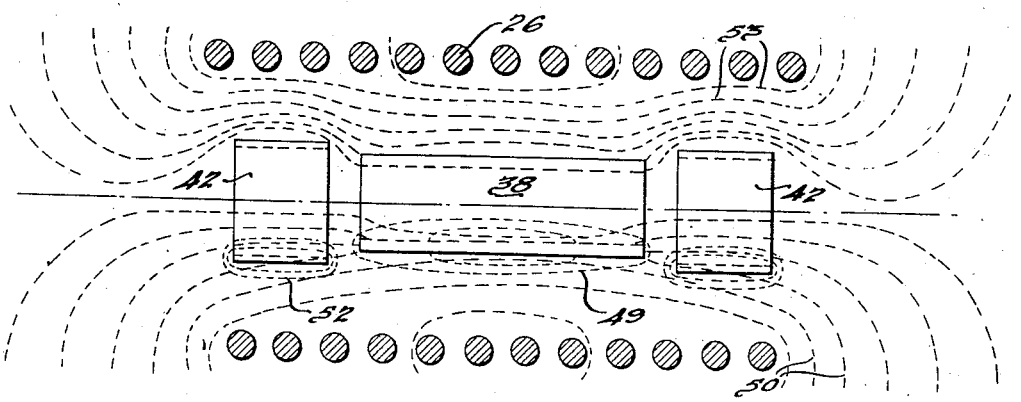

Patented Oct. 27, 1942

2,299,934

UNITED STATES PATENT OFFICE 2,299,934

INDUCTIVE HEATING APPARATUS AND METHOD

Vernon W. Sherman, Royal Oak, and Omer E. Bowlus, Highland Park, Mich., assignors to Chrysler Corporation, Highland Park, Mich., a corporation of Delaware Application December 16, 1940, Serial No. 370,248

7 Claims. (Cl. 219—13)

This invention relates to an improved apparatus and method for directing the flux lines of a field of an induction coil in predetermined paths.

More particularly, the invention relates to an improved apparatus and method by which the flux lines of the field of an induction heating coil may be distributed uniformly throughout substantially all portions of a piece of work or concentrated at selective parts of the work.

One of the main objects of the invention is the provision of an apparatus and a method of this character which compensates for the distortion of the flux lines of an induction heating field which results from the counter magnetomotive force generated when a piece of work comprising electrical current conducting material is placed in a flux field.

Another object of the invention is the provision of inductive heating apparatus of this kind which uniformly heats substantially all portions of a piece of work without substantial loss of effective heating value of any portion of a flux field.

Illustrative embodiments of the invention are shown in the accompanying drawings, in which:

Fig. 1 is a fragmentary longitudinal sectional view of induction heating apparatus having flux directing means embodying the invention.

Fig. 2 is a view similar to Fig. 1 but showing a further development of the invention.

Fig. 3 is a transverse sectional view taken on the line 3—3 of Fig. 2.

Fig. 4 is a fragmentary sectional view of an induction heating apparatus having flux diverting and directing means embodying a still further development of the invention.

Fig. 5 is a wire diagram illustrating a high frequency alternating current circuit and induction heating field producing apparatus which is particularly suitable for use in connection with our invention.

Fig. 6 is a diagrammatic view of an induction heating coil illustrating the courses of the flux lines of the field thereof in the absence of an electrical current conductive body.

Fig. 7 is a view similar to Fig. 6 but showing a piece of work comprising a conductive body in the field while illustrating in the lower portion of the figure the courses of the flux lines of the main and counter magnetomotive fields tend to follow and illustrating, in the upper portion of the figure, the resultant paths of the flux lines of the main field.

Fig. 8 is a view similar to Fig. 6 but illustrating at the lower portion of the figure, the courses the flux lines of the main counter magnetomotive and compensating fields tend to follow and illustrating, in the upper portion of the figure, the resultant paths of the flux lines of the main field.

One inductive heating apparatus with which our invention may be used to particular advantage is illustrated in the form of a wire diagram in Fig. 5 in which is shown a circuit for producing and supplying to an inductive heating coil alternating current of ultra high frequency substantially of radio frequency order. This apparatus includes a thermionic tube 12 having a cathode 13, plate 14 and grid 15. The plate 14 is connected to a positive terminal of a high voltage source 16 by a conductor 17 in which is included a radio frequency choke 18. The negative terminal 19 of the high voltage source is connected by a conductor 20 to the cathode 13 and the cathode is grounded at 21. The grid has a lead 22 connected to a conductor 23 which leads through a fixed condenser 24 to one terminal 25 of an induction heating coil 26. The other terminal 27 of the heating coil 26 is connected by a conductor 28 with the plate 14 and the conductor 17 at 29. The conductor 28 includes a fixed condenser 30. A variable condenser 31 is shunted across the terminals 25 and 27 of the heating coil. The cathode 13 may be variably connected to a selected turn of the coil 26 by a conductor 32. There is also included in the grid circuit a shunt connection from the conductor 20 to the grid lead 22 in which is included a radio frequency choke coil 33 and a fixed resistance 34.

While the foregoing circuit is suitable for energizing an inductive heating coil with ultra high frequency alternating current, it will be obvious that any of a large number of circuits may be employed for this purpose in connection with applicants' invention. It should also be understood that applicants' invention may be used to advantage in connection with inductive heating apparatus supplied with current of any desired frequency characteristic.

In the form of the invention illustrated in Fig. 1, there is provided within the interior of the coil 26 a support 35 preferably comprising di-electric material incapable of conducting electrical current. The support 35 is of cylindrical shape and has an enlarged intermediate portion 36 at the extremities of which are mounted washers 37, also comprising di-electric material. The washers 37 are predetermined in diameter to smoothly fit within the passage of a piece of work diagrammatically illustrated in Fig. 1 as comprising a ferrous metal cylinder 38 such as is used in wristpin bearings. Mounted on the support 35 on respectively opposite sides of its intermediate portion 36 is a pair of flux deflecting elements 39 having tapered adjacent extremities which extend into the interior of the ferrous metal sleeve 38. The flux deflecting elements 39 may comprise any electrical current conductive material but they are preferably formed of copper. These flux deflecting elements are so predetermined in shape, dimensions and material of which they consist as to divert the portions of the flux lines of the field of the coil 26 adjacent the ends of the sleeve 38 outwardly in the same directions and to an extent substantially equal to the distortion of the portions of the flux lines in the vicinity of the intermediate part of the sleeve 38 as will be hereinafter more clearly described in connection with Figs. 6 to 8, inclusive.

In the form of the invention illustrated in Fig. 2, there is disposed within the inductive heating coil 26 work supporting mechanism which comprises a central supporting bar 40 and spaced parallel supporting bars 41. The central bar 40 is of rectangular cross section and adapted to fit snugly within the cylindrical piece of work 38 which illustrates only one of many forms of pieces of work the apparatus is adapted to heat. Mounted on the upper and lower parallel bars 41 which, like the central bar 40, comprises di-electric material is a pair of flux deflecting elements 42. Each of the flux deflecting elements 42 comprises a cylinder which is held in spaced relation to an extremity of the sleeve 38 by channel-shaped clips 43 which are preferably formed integral with the sleeve-like body portions of the flux deflecting elements. The parallel bars 41 of the support mechanism are received in the channels of the clips 43 as illustrated in Fig. 3 so as to positively position the flux deflecting elements 42 with respect to the work.

In the illustration shown in Fig. 2, the tubular flux deflecting elements 42 are shown to be slightly larger in diameter than the diameter of the sleeve 38. It is preferable that the flux deflecting elements 42 be at least as large in diameter as the work but, as hereinafter more clearly set forth, the outer dimensions of the flux deflecting elements may be varied by suitably proportioning the wall thickness and the character of the material of which these elements are formed. The flux deflecting elements 42 are, like the corresponding elements 39 of Fig. 1, so predetermined and arranged as to compensate at the ends of the work 38 for the distortion of the flux lines of the field of the coil 26 at the intermediate part of the work piece which results from the countermagnetomotive force generated by the action of the field on the work piece.

In Fig. 4 of the drawings is illustrated a modified form of the invention in which flux diverting elements embodying the invention are relied upon to selectively direct and concentrate the flux lines of the field of the coil 26 at selected portions of a piece of work such as a gear 44 having teeth 45 and an adjacent peripheral portion which it is desired to heat in order to harden or otherwise treat the metal of which these portions of the coil consist without excessively affecting the remaining portion of the coil. In this form of the invention, the gear 44 is mounted on a support 46 which comprises di-electric material and preferably centrally disposed within the coil 26. A flux deflecting element 47 is mounted on the support 46 and disposed adjacent the respectively opposite side faces of the gear 44. The flux deflecting discs 47 are so constructed and arranged as to divert to the teeth 45 and adjacent peripheral portions of the gear the flux lines of the field of the coil 26 which normally tend to be distributed throughout the gear thus concentrating the action and effect in the portions of the gear which it is desired to harden or otherwise treat.

The operation of the flux deflecting elements of each form of the invention is illustrated in Figs. 6, 7 and 8 in which an analysis of the action of the form of the invention illustrated in Fig. 2 is employed as an example. In Fig. 6 is illustrated the normal courses the flux lines 48 of the coil 26 take when passing only through air such as for example, in the absence of an electrical conductive body from the interior of the coil. The normal flux lines 48 extend substantially parallel to the axis of the coil 26 throughout a substantial portion of its length. When a piece of work, as for example, the ferrous metal 38 is placed in the interior of the coil 26, there is a current induced in the ferrous metal which sets up a counter magnetomotive field having flux lines extending in the paths illustrated by the dotted lines 49 as illustrated in the lower portion of Fig. 6. The mere presence of the work 38 in the field of the coil 26 causes the flux lines of the latter to tend to concentrate in the metal of the work and to tend to flow in the courses illustrated by the dotted lines 50. The effect of the flux lines 49 of the counter magnetomotive field in addition to the tendency of the flux lines to follow the body of the metal of the work, however, produces the resultant flux line courses 51 illustrated in the upper portion of Fig. 6. The flux lines 51 tend to thread through the end portions of the work 38 but they are diverted outwardly from the work by the counter magnetomotive force generated by the action of the field of the coil 26 upon the work. This distortion of the flux lines of the field of the coil results in an uneven distribution of flux throughout the work and consequently produces non-uniform heating of the work. The directions in which the flux lines of the field of the coil 26 are diverted is dependent mainly upon the shape of the work. Compensation for the foregoing flux line distortion may be made regardless of the shape of the work by appropriate construction and arrangement of the flux diverting elements.

The operation of the flux diverting elements 42 of tubular shape upon the flux of a field having a cylindrical piece of work 38 therein is illustrated in Fig. 8 in which the dotted lines 49 in the lower portion of the figure represent the paths the flux lines of the counter magnetomotive force tend to take, while the dotted lines 50 represent the courses which the flux lines of the coil 26 tend to take as a result only of the presence of the work in the field of the coil. The presence of the flux diverting elements 42 in the field of the coil 26 results in the production of a third flux field, the flux lines of which tend to follow the courses illustrated in dotted lines at 52 in the lower part of Fig. 8. This latter field is generated as a result of the current induced in the elements 42 which comprise electrical current conductive material. The resultant action of the flux lines 49 and 52 upon the field of the coil is illustrated in the upper portion of Fig. 8 in which the resultant paths of the flux lines are shown by dotted lines 53. The flux deflecting elements 42 which, as set forth above, may comprise diverse materials and shapes are so constructed and arranged with respect to the work 38 as to divert the flux lines of the coil 26 which thread the end portions of the work outwardly substantially as far and substantially in the same direction as the portions of the flux lines which register with the intermediate part of the work are diverted by the counter magnetomotive force generated by the action of the field upon the work.

In the foregoing manner, a compensation may be made in the vicinity of any selected portion of a piece of work for the counter magnetomotive force existing at any other portion of the work and the flux lines of the inductive heating field may thus be selectively directed so as to uniformly heat all portions of a piece of work as illustrated in Fig. 8 or as to concentrate the heating action upon selected portions of a piece of work while shielding other portions of the work in the manner illustrated in Fig. 4.

The foregoing flux directing apparatus and method is particularly advantageous in connection with ultra high frequency inductive heating processes for the reason that with ultra high frequency currents of the nature of radio frequency values, there is a tendency to concentrate the heating action on the surface skin of the work when, as in the example illustrated in Fig. 6, the flux lines are also concentrated at the ends or other isolated portions of a piece of work, the resulting non-uniform heating of the outer skin or surface of the metal is excessive and can be successfully controlled by diverting the flux lines from such portions of the work in the manner illustrated.

Although but several specific embodiments of the invention have been herein shown and described, it will be understood that various changes in the size, shape and arrangement of parts may be made without departing from the spirit of the invention.

What is claimed is:

1. Induction heating apparatus comprising means for producing a flux field, a support for positioning a piece of work to be threaded by the flux lines of said field, and flux diverting elements each comprising a closed, ringlike, mass of material of high electrical conductivity having a main body portion located within the longitudinal extremities of said field beyond the extremities of said piece of work which are disposed transversely of the longitudinal axis of said field for producing an induced counter magnetomotive force at a selected location to direct the flux lines of said field through and concentrate the same in selected portions of said work.

2. Induction heating apparatus comprising means for producing a flux field including a coil member, a support comprising dielectric material extending axially of said coil for positioning a piece of work to be threaded by the flux lines of said field, and flux deflecting elements comprising electrical current conductive material having a main body portion of generally annular cross section each located between one of the longitudinal extremities of said field and that adjacent extremity of said work which is disposed transversely of said field, said elements being so constructed and arranged with respect to the end portions of said work as to maintain the portions of the flux lines of said field which register with said work generally parallel to the axis of said work.

3. Induction heating apparatus comprising means for producing an attenuating flux field of substantially radio frequency order, support means for positioning the walls of a cylindrical piece of work to be threaded in the general direction of the length of said work by flux lines of said field, and flux deflecting elements adjacent the extremities of said work comprising bodies of electrical current conductive material having tapered end portions extending thereinto and so constructed and arranged as to divert the flux lines of the portion of said field adjacent the ends of said work radially outwardly of said cylindrical work piece substantially as far as the flux lines of the part of said field adjacent the intermediate portion of said work piece are deflected outwardly by the counter magnetomotive force generated by the action of said field on said work piece.

4. Induction heating apparatus comprising means for producing an alternating flux field of substantially radio frequency order, support means for positioning the walls of a cylindrical piece of work to be threaded in the general direction of the length of said work by flux lines of said field, and flux deflecting elements adjacent the extremities of said work comprising cylindrical bodies of electrical current conductive material having a diameter at least as large as that of said work piece and arranged in spaced substantially concentric relationship with respect to the extremities of said work piece for compensating, at the end portions of said work piece, for the distortion of the flux lines of said field caused at the intermediate part of said work piece by the counter magnetomotive force generated by the action of said field on said work piece.

5. Apparatus for selectively inductively heating the teeth and adjacent peripheral portions of a gear comprising means for producing an alternating flux field, a support for positioning a gear in said field with its radial planes disposed substantially normal to the flux lines of the latter, and flux diverting and shielding means comprising spaced elements formed of electrical current conductive material and arranged adjacent opposite side faces of said gear for diverting to the teeth and adjacent peripheral portions of said gear the flux lines of said field which are normally distributed throughout the gear.

6. Induction heating apparatus comprising means for producing a flux field, a support for positioning a piece of work to be threaded by the flux lines of said field, and a flux diverting element comprising metal of high electrical conductivity for producing an induced counter magnetomotive force at a selected location, said element having a closed ring body portion located between one longitudinal extremity of said field and a corresponding extremity of said piece of work and being so constructed and arranged as to repel certain of the flux lines of said field threading said extremity to substantially the same extent as the flux lines in the vicinity of another portion of said piece of work are repelled by the induced counter magnetomotive force generated by the action of said field on said latter portion of said work.

7. In inductively heating articles, the method of directing the flux lines of an inductive heating field which comprises repelling by an induced counter magnetomotive force the portions of the flux lines adjacent opposite end portions of a piece of work in the same direction and substantially as far as the portions of said flux lines adjacent intermediate portions of said work are repelled by the counter magnetomotive force generated by the action of said field on said work by placing electrical current conductive material in the path of said flux field immediately in advance of the opposite ends of said work and between the latter and the longitudinal extremities of said field.

VERNON W. SHERMAN.
OMER E. BOWLUS.